(12) United States Patent
Fischer et al.

(10) Patent No.: US 7,061,173 B2
(45) Date of Patent: Jun. 13, 2006

(54) AMALGAM-DOPED LOW MERCURY LOW-PRESSURE UV IRRADIATOR

(75) Inventors: Joachim Fischer, Hessisch Oldendorf (DE); Jan Boris Rudkowski, Bielefeld (DE); Dirk Riepe, Herford (DE); Rolf Sief, Bielefeld (DE)

(73) Assignee: Wedeco AG Water Technology (DE)

( * ) Notice: Subject to any disclaimer, the term of this patent is extended or adjusted under 35 U.S.C. 154(b) by 196 days.

(21) Appl. No.: 10/471,922

(22) PCT Filed: Nov. 13, 2002

(86) PCT No.: PCT/EP02/12679

§ 371 (c)(1),
(2), (4) Date: Sep. 16, 2003

(87) PCT Pub. No.: WO03/060950

PCT Pub. Date: Jul. 24, 2003

(65) Prior Publication Data

US 2004/0232846 A1 Nov. 25, 2004

(30) Foreign Application Priority Data

Jan. 16, 2002 (DE) ......................... 102 01 617

(51) Int. Cl.
*H01J 1/62* (2006.01)

(52) U.S. Cl. .................... 313/490; 313/493; 315/94

(58) Field of Classification Search .......... 315/94–108, 315/112–118; 313/564, 565, 568, 570, 571, 313/490, 493; 422/186.06, 486.07, 186.15
See application file for complete search history.

(56) References Cited

U.S. PATENT DOCUMENTS

| 5,237,240 | A |   | 8/1993  | Bouchard      | 313/550    |
|-----------|---|---|---------|---------------|------------|
| 5,274,305 | A |   | 12/1993 | Bouchard      | 315/108    |
| 5,581,157 | A |   | 12/1996 | Vrionis       | 315/117    |
| 5,909,085 | A | * | 6/1999  | Nelson        | 315/94     |
| 6,124,679 | A |   | 9/2000  | Vrionis       | 315/248    |
| 6,172,452 | B1| * | 1/2001  | Itaya et al.  | 313/490    |
| 6,635,991 | B1| * | 10/2003 | Bakker et al. | 313/568    |
| 6,713,027 | B1| * | 3/2004  | McNulty, Jr.  | 422/186.06 |

FOREIGN PATENT DOCUMENTS

| DE | 197 34 811 | 2/1998  |
| EP | 0 484 117  | 5/1992  |
| JP | 61225753   | 10/1986 |
| JP | 3266352    | 11/1991 |

OTHER PUBLICATIONS

J. R. Coaton and A. M. Marsden. 1997. John Wiley & Sons, Inc. Fourth edition. p. 153.*

* cited by examiner

*Primary Examiner*—Wilson Lee
(74) *Attorney, Agent, or Firm*—Robert W Becker & Associates; Robert W Becker

(57) ABSTRACT

A UV lamp unit is provided and comprises a lamp in the form of a mercury low pressure amalgam lamp that is provided with at least one amalgam deposit. A cladding tube surrounds the lamp in such a way that an air gap is provided between the lamp and the cladding tube. An element is provided in one axial direction of the lamp, in the region of the at least one amalgam deposit, for influencing the temperature of the amalgam.

9 Claims, 1 Drawing Sheet

AMALGAM-DOPED LOW MERCURY LOW-PRESSURE UV IRRADIATOR

BACKGROUND OF THE INVENTION

The present invention concerns an amalgam mercury low pressure UV lamp. Such lamps are in operational use. They are used in the disinfection of water and waste water and are superior because of their especially high efficiency. This high efficiency is achieved by binding the mercury into an amalgam (preferably indium) in a lamp with low internal pressure. This mercury is released in the gas phase when the lamp reaches an operating temperature of some 90° C. The decisive factor for this operating temperature is the temperature of the amalgam.

Other types of UV lamps are those low pressure lamps not equipped with amalgam, whose optimal operating temperature is in the region of about 40° C., with these lamps displaying a lesser efficiency, and medium pressure UV lamps which display an internal pressure of some 1,000 mbar and have an operating temperature of several hundred degrees Celsius. These lamps do have a relatively high output in the kilowatt area. But the efficiency, thus the ratio between radiation output in the desire wavelength range and electrical power consumption, is lower than the efficiency of the amalgam mercury low pressure UV lamp found here.

In order to reach the aforementioned optimal temperature of some 90° C. in operation, generic UV lamps are not immersed directly into the liquid to be disinfected. The temperatures prevailing there in the drinking water or waste water domain are too low to maintain the necessary temperature of the UV lamp. Therefore they are sheathed in cladding tubes, which delimit an air gap between their inner wall and the outside of the UV lamp. The low thermal conductivity of air guarantees, in the operation of the UV lamp, that the latter will not cool down to below 90° C. But the basic requirement is a sufficiently high electrical power.

It is apparent from these boundary conditions that generic UV lamps when operated in a cladding tube can only be adjusted to a limited extent. So for example in ex-factory UV lamps, which display an especially high initial UV yield, the electrical power cannot be reduced so far that the radiated UV intensity is reduced to the level released later on when the UV lamp is older. The UV lamp then becomes too cold, which reduces the radiation yield.

In another case, the operating condition may arise where the water to be treated is at a relatively high temperature, for example 60° C. If relatively old UV lamps are used in these operating conditions, a high level of electrical power must be supplied to them in order to provide the necessary UV intensity. The result of the high ambient temperature is that the UV lamp is not cooled to the optimal operating range, as occurs at lower temperatures. The efficiency of the UV lamp falls, because the temperature of the UV lamp settles to over 90° C. This operating condition is not desirable.

It is therefore the task of the present invention to improve an amalgam mercury low pressure UV lamp in such a way that it can be operated independently of the water temperature and preferably with variable UV output.

SUMMARY OF THE INVENTION

This task is resolved by a UV lamp unit comprising a lamp or irradiator in the form of a mercury low pressure amalgam lamp that is provided with at least one amalgam deposit, a cladding or jacket tube that surrounds the lamp in such a way that an air gap is provided between the lamp and the cladding tube, and means provided in one axial direction of the lamp, in the region of the at least one amalgam deposit, for influencing the temperature of the amalgam.

Because in the axial line of the UV lamp, at the axial position of the amalgam deposit, a means of influencing the temperature of the amalgam is provided, if the amalgam temperatures are low, the temperature can be raised. Preferably the means of influencing the temperature is also designed such that the temperature of the amalgam can also be lowered, if this should be too high with respect to the optimal operating range.

A preferred design of the invention inserts a metallic band between the lamp and the cladding tube. The band preferably extends in the direction of the periphery of the UV lamp to the axial position of the amalgam. This band can, according to a refinement of the invention, be made at least partly from bimetal, so that the spatial arrangement alters as a function of temperature. If the band is fixed in the area of the amalgam to the UV lamp and an area is provided which moves radially with respect to the UV lamp, said area being able to attach itself to the inside of the cladding tube, the band can also be used to disperse heat from the area of the amalgam, thus allowing cooling.

Another design for this invention provides an electrical heater element arranged on the outside of the UV lamp in the area of the amalgam. This heater element can be in the, form of an ohmic resistor or PTC resistor. For preference, the resistor abuts on the outside of the UV lamp in the area of the amalgam and on the inside of the cladding tube, so that without admitting electrical current to the heater element, heat can be transferred from the lamp to the cladding tube and in this way the amalgam can be cooled. An especially simple wiring of the heater element is possible, if this heater element is connected in parallel to a spiral-wound filament of the lamp. The heater can then be switched on using the heating current for the heating filament. It is also possible to connect the electrical heater element in parallel to the connections of the UV lamp so that the heater works as a function of the operating voltage of the UV lamp.

BRIEF DESCRIPTION OF THE DRAWINGS

Three examples of designs for this invention are described below with the aid of the drawing.

These show.

DESCRIPTION OF PREFERRED EMBODIMENTS

Figure 1:
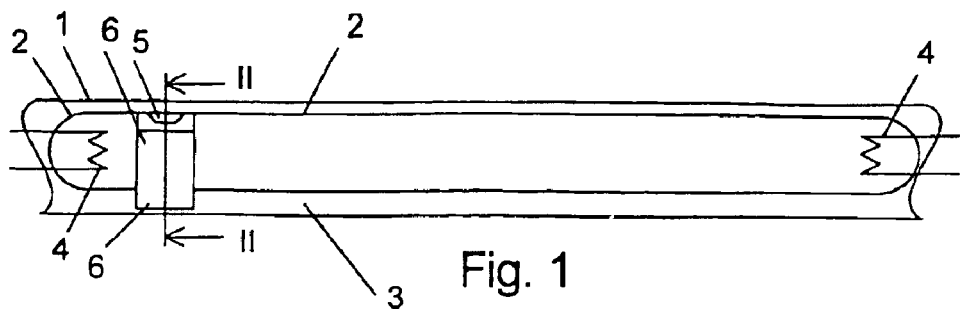
FIG. 1: A UV lamp according to invention with a band-shaped means of influencing temperature in a lateral view.

In FIG. 1, a UV lamp unit according to invention is shown in a lateral view. The lamp unit displays an external cladding tube 1 which surrounds a UV lamp 2 in the form of an amalgam mercury low pressure UV lamp. Between the cladding tube 1 and the UV lamp 2 there is an air gap 3. The UV lamp 2 displays, in a standard way, spiral-wound filaments 4 which can be powered to start and maintain the gas discharge with an incandescent voltage and an operating voltage respectively. At an axial distance from the left spiral-wound filament 4 an amalgam deposit 5 provided which, again in a standard way, can consist, for example, of an indium-mercury amalgam. This amalgam is particularly highly efficient in operating the UV lamp.

A metal coil 6, which slightly surpasses the axial extension of the amalgam deposit 5, is fixed in the area of the amalgam deposit 5 externally on the UV lamp 2 and lies in the air gap 3 between the cladding tube 1 and the UV lamp 2.

Figure 2A:
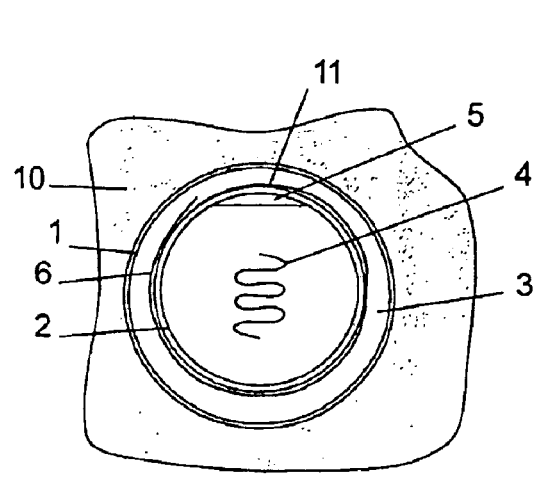
FIG. 2a, 2b: the UV lamp according to FIG. 1 in an axial cross section in the area of the amalgam.
Figure 2B:
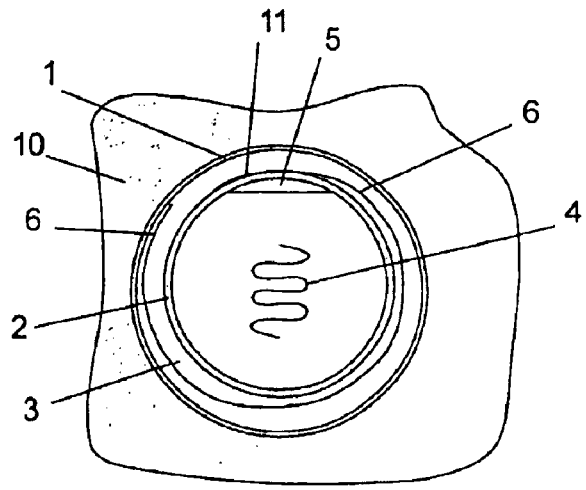

The more precise structure in the area of the line II—II is shown in more detail in FIGS. 2a and 2b, which show a cross section through the lamp unit according to FIG. 1 along this line.

FIG. 2a shows the lamp unit with the cladding tube 1, which is surrounded here by the liquid to be disinfected 10, at low operating temperature. The coil 6 is connected at 11 to the exterior of the UV lamp 2 so as to conduct heat, for example pasted on there with a UV-resistant adhesive. Starting from position 11, the coil 6 runs as far as its free end roughly parallel to the circumferential line of the UV lamp 2. In this example of design the coil 6 is made from bimetal and because of the low temperatures is in a spatial design which corresponds roughly to the perimeter of the UV lamp 2. So it abuts closely against the UV lamp up to its free end.

In FIG. 2b the configuration according to FIG. 2a is shown at a higher operating temperature. The coil 6 expands due to the effect of the temperature, with the fastening at position 11 holding the coil 6 there firmly. The free end of the coil 6 approaches the cladding tube 1. In the intermediate area, the coil 6 is raised from the surface of the UV lamp 2.

In operation the lamp unit described thus works as follows:

Firstly the UV lamp 2 is ignited in the accepted way such that the gas discharge develops in the interior of the UV lamp 2. As the result of the gas discharge the UV lamp 2 heats up. The heat produced in the UV lamp 2 is dispersed via the air gap to the cladding tube 1 and there released into the liquid 10, so that the temperature within the UV lamp rises from the start, until it attains a state of equilibrium. When the liquid to be disinfected 10 is at low temperatures, which sometimes occur in the waste water and drinking water domain, the condition may arise that the equilibrium temperature in the UV lamp 2 is not sufficient to bring the amalgam in the amalgam deposit 5 to the optimal operating temperature, which is in the region of 90–95° C. In these cases, the coil 6, which closely abuts against the UV lamp 2 as in FIG. 2a, reflects the radiation output to the axial position of the amalgam deposit 5 into the interior of the UV lamp 2 so that at this point the temperature in the UV lamp rises. The coil 6 also absorbs the heat emanating from the UV lamp. In addition the coil heats up as the result of absorbed radiation flux from the UV lamp 2. The coil 6 is heated up and transfers this heat via the thermally conductive connection at position 11 to the amalgam deposit 5, so that the latter at first heats up more rapidly in the start phase, so that the UV lamp 2 reaches its operating temperature and thus its excellent efficiency more quickly in comparison to the usual arrangements. In operation the coil 6, at low temperatures of the liquid 10, prevents a drop to below the operating temperature of the UV lamp 2 and thus in turn ensures lasting good efficiency. Furthermore, if the operating conditions allow, the electrical power supplied to the UV lamp 2 can be reduced. This reduction of the electrical power can for example be desired if the flow rate of the liquid to be disinfected 10 is low and therefore a low UV intensity will result in adequate disinfection. The reduced electrical power leads to a reduction of the equilibrium temperature in the interior of the UV lamp 2. This drop in temperature counteracts the effect of the coil 6, described above, on the amalgam deposit 5.

FIG. 2b shows the UV lamp according to FIG. 2a under operating conditions at higher temperature. The coil 6 has expanded because of its bimetallic properties. In the air gap 3 it approaches the cladding tube 1 more closely or can abut on the cladding tube if the temperature continues to rise. In this way the coil 6 conducts away heat which is absorbed in the area of the thermally conductive connection at 11 from the amalgam deposit 5, to the cooler cladding tube wall of the cladding tube 1. In this way, the amalgam deposit 5 is cooled so that at electrical power or at a high temperature of the liquid 10 the temperature of the amalgam deposit 5 does not increase excessively. Thus the coil 6 can counteract any heating of the amalgam deposit 5 beyond the range of the optimal operating temperature. This guarantees that the operating temperature, which assures a good efficiency, is maintained.

In addition to the design shown in FIGS. 1 and 2 with a bimetallic coil, other mechanical solutions are also possible, such as e.g. devices which exploit specific characteristics of what are known as shape memory metals. So it is also possible e.g. to arrange a screen between the amalgam deposit 5 and the cladding tube 1 which is displaced depending on the temperature in radial direction or axial direction of the UV lamp 2 and thus adjusts the temperature of the amalgam deposit 5. It is also possible to arrange a radiation reflector on the side of the UV lamp 2 diametrically opposite the amalgam deposit 5, which reflects back only the radiation output occurring there to the amalgam deposit 5 and which if necessary alters its reflective properties as a function of temperature.

Figure 3:
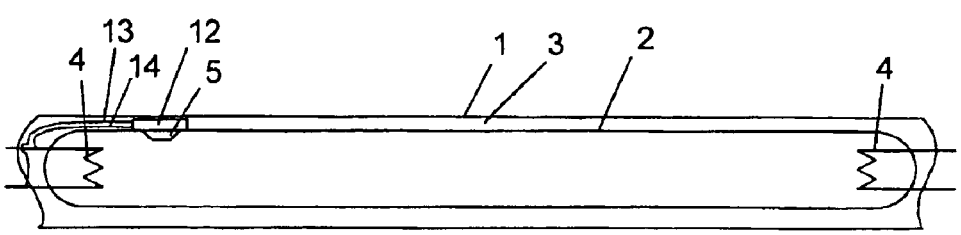
FIG. 3: a UV lamp with an electrical heating means.
Figure 4:
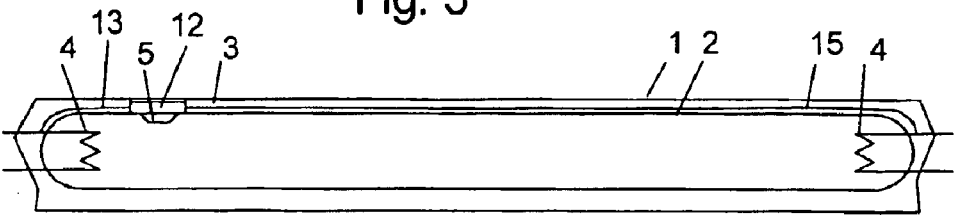
FIG. 4: A UV lamp with an electrical heating means wherein the heating voltage of the electrical heating means is tapped from the voltage applied between the diametrically opposed spiral-wound filaments.

Another design of this invention is shown in FIGS. 3 and 4. This design does not provide a mechanical device to influence the temperature of the amalgam deposit 5, but an electrical heating device 12. The heating device 12 is fastened as a heat conductor on the exterior of the UV lamp 2 in the area of the amalgam deposit 5. It can for example consist of a simple heating resistor, a PTC (positive temperature coefficient) resistor or a VDR (voltage-dependent resistor). The heating element 12 in FIG. 3 is connected via connecting lines 13 and 14 parallel to the spiral-wound filaments 4 so that when the heating voltage for the spiral-wound filaments 4 is switched on, there is also a heating voltage for the heating element 12. In this way, the amalgam in the amalgam deposit 5 is heated right from the starting procedure. This allows the operating temperature to be reached more quickly. If the electrical power supplied is reduced, the heating voltage can then be switched on again, in order to prevent the UV lamp cooling off. Preferably, the heating element 12 with its thermally conducting exterior abuts on the cladding tube 1, so that without being supplied with heating voltage, the heating element 12, due to its own thermal conductivity, can disperse heat from the amalgam deposit 5 to the cladding tube and thus contribute to a reduction in the operating temperature, if the temperature in the UV lamp 2 rises above the optimal range.

In FIG. 4, the lamp unit is again provided with a heating resistor 12 as described above. The connections 13 and 15 are however laid out in FIG. 4 in such a way that the heating voltage of the heating element 12 is tapped from the voltage applied between the diametrically opposed spiral-wound filaments 4. The heating voltage 12 is thus obtained from the operating voltage of the UV lamp.

This configuration can be used when the UV lamp is controlled in operation via the current, thus for example is operated with constant current. Depending on the operational con and especially depending on the temperature in the UV lamp, the voltage applied at the UV lamp will then adjust itself. In that case a high lamp voltage is an indication of too low a temperature of the amalgam deposit 5. In the circuit shown in FIG. 4, if the UV lamp voltage were to rise above a defined value, the heating in the heating element 12, which is designed here by way of example as a VDR, would increase. The temperature in the amalgam deposit 5, because of the heat output fed in, would also rise, so that the operational voltage falls again. Gradually, a controlled equilibrium will develop which, when the heating resistor 12 is suitably designed, lies in the range of the optimal operating temperature. Also, in this configuration, without the heating element 12 being supplied with heating voltage, any excessive heat from the amalgam deposit 5 can be released to the cladding tube 1, so that when there is higher output or higher outside temperature the amalgam deposit 5 is cooled.

What is claimed is:

1. A UV lamp unit, comprising:
    a lamp in the form of a mercury low pressure amalgam lamp that is provided with at least one amalgam deposit;
    a cladding tube that surrounds said lamp in such a way that an air gap is provided between said lamp and said cladding tube, and;
    means provided in an axial direction of said lamp, in the region of said at least one amalgam deposit, for influencing the temperature of the amalgam, wherein said means for influencing said temperature of the amalgam is a band of metallic material disposed between said lamp and said cladding tube, wherein said band is secured to said lamp in the area of the amalgam, and wherein said band has an area that is radially movable relative to said lamp.

2. A UV lamp unit according to claim 1, wherein said means for influencing the temperature of the amalgam is disposed on an axial position of said at least one amalgam deposit.

3. A UV lamp unit according to claim 1, wherein said band is disposed at an axial position of the amalgam and extends in a peripheral direction of said lamp.

4. A UV lamp unit according to claim 1, wherein said band is made at least partially from bimetal so that a spatial arrangement thereof alters as a function of temperature.

5. A UV lamp unit according to claim 1, wherein an electrical heating element is disposed on the outside of said lamp in the vicinity of the amalgam.

6. A UV lamp according to claim 5, wherein said heating element is in the form of an ohmic resistor or a PTC resistor.

7. A UV lamp unit according to claim 6, wherein said resistor abuts against an outside of said lamp in the area of the amalgam and on an inside of said cladding tube, so that without an application of electrical current to said heating element, heat is transferred from said lamp to said cladding tube to thereby cool the amalgam.

8. A UV lamp unit according to claim 5, wherein said heating element is connected in parallel to a spiral wound filament of said lamp.

9. A UV lamp unit according to claim 5, wherein said electrical heating element is connected in parallel to connections of a supply voltage of said lamp.

* * * * *

UNITED STATES PATENT AND TRADEMARK OFFICE
CERTIFICATE OF CORRECTION

PATENT NO.       : 7,061,173 B2
APPLICATION NO.  : 10/471922
DATED            : June 13, 2006
INVENTOR(S)      : Fischer et al.

It is certified that error appears in the above-identified patent and that said Letters Patent is hereby corrected as shown below:

Title Page, Item [54] and Column 1, should read as follows:

[54] Title: AMALGAM LOW PRESSURE MERCURY UV LAMP

Signed and Sealed this

Eighth Day of August, 2006

JON W. DUDAS
*Director of the United States Patent and Trademark Office*